United States Patent
Yamazaki et al.

(10) Patent No.: US 7,411,152 B2
(45) Date of Patent: Aug. 12, 2008

(54) PLASMA DETECTOR AND LASER BEAM MACHINE WITH PLASMA DETECTOR

(75) Inventors: Tsunehiko Yamazaki, Aichi-ken (JP); Naoomi Miyagawa, Gifu-ken (JP)

(73) Assignee: Yamazaki Mazak Kabushiki Kaisha (JP)

( * ) Notice: Subject to any disclaimer, the term of this patent is extended or adjusted under 35 U.S.C. 154(b) by 552 days.

(21) Appl. No.: 11/047,393

(22) Filed: Jan. 31, 2005

(65) Prior Publication Data

US 2005/0178749 A1 Aug. 18, 2005

(30) Foreign Application Priority Data

Feb. 5, 2004 (JP) ............... 2004-029509

(51) Int. Cl.
*B23K 26/02* (2006.01)
(52) U.S. Cl. .................. 219/121.83; 219/121.6
(58) Field of Classification Search ............ 219/121.83, 219/121.6
See application file for complete search history.

(56) References Cited

U.S. PATENT DOCUMENTS

| | | | | | |
|---|---|---|---|---|---|
| 4,447,151 | A | * | 5/1984 | McLellan et al. | ............ 356/218 |
| 5,013,886 | A | * | 5/1991 | Koegl et al. | ............ 219/121.83 |
| 5,059,761 | A | * | 10/1991 | Koegl et al. | ............ 219/121.83 |
| 5,247,155 | A | * | 9/1993 | Steen et al. | ............ 219/121.83 |
| 6,150,826 | A | * | 11/2000 | Hokodate et al. | ............ 324/662 |
| 2002/0125233 | A1 | | 9/2002 | Horn et al. | |
| 2003/0102294 | A1 | * | 6/2003 | Kinbara et al. | ......... 219/121.83 |
| 2004/0159643 | A1 | * | 8/2004 | Mutoh et al. | ............ 219/121.83 |

FOREIGN PATENT DOCUMENTS

| JP | 55117586 | * | 9/1980 |
|---|---|---|---|
| JP | 2000084683 | * | 3/2000 |

OTHER PUBLICATIONS

EP Int'l. Search Report, May 24, 2005.

* cited by examiner

*Primary Examiner*—M. Alexandra Elve
(74) *Attorney, Agent, or Firm*—Robert F. Zielinski; Brian L. Belles; Buchanan Ingersoll & Rooney PC

(57) ABSTRACT

Voltage fluctuating time integrating means integrates voltage fluctuating time when voltage of a sensor electrode fluctuates as a voltage fluctuation integrated time, and voltage fluctuation occurrence rate computing means computes a rate of occurrence of voltage fluctuation for time on the basis of the voltage fluctuation integrated time integrated. By doing so, quantity of generated plasma can be taken as the rate of occurrence of voltage fluctuation, and plasma detection judging means can easily detect large volume of generated plasma on the basis of the computed voltage fluctuation occurrence rate. Then, it is not necessary to provide a circuit for measuring electric resistance between the sensor electrode and a workpiece as a conventional way, thereby avoiding complexly structured plasma detector.

10 Claims, 6 Drawing Sheets

(a)

(b)

PLASMA DETECTOR AND LASER BEAM MACHINE WITH PLASMA DETECTOR

BACKGROUND OF THE INVENTION

The invention relates to a plasma detector and a laser beam machine with a plasma detector. Particularly, the invention relates to a plasma detector and a laser beam machine with a plasma detector for easily detecting plasma harmful to machining, having no complex structure.

Such kind of known conventional plasma detector measures electric resistance between a sensor electrode provided at a top end of a torch and a workpiece, and detects plasma generating from the workpiece on the basis of the measured electric resistance. When generating plasma, the voltage of a sensor electrode ("the trace voltage" hereinafter) fluctuates irrespective of a gap length between the torch and the workpiece, so that trace control does not nomally function. And, the portion between the sensor electrode and the workpiece is filled with charged particles comprising the generated plasma. For this reason, the above-mentioned electric resistance shows a predetermined value, being changed from open state (infinity). Then, plasma can be easily detected by watching the electric resistance. When thus detecting plasma, for instance, a feeding speed of the torch is decreased in order to restrict generation of plasma, so that the trace control can stably function.

In order to measure the electric resistance between the sensor electrode and the workpiece, it is necessary to provide a plasma detector with a circuit for measurement of electric resistance. If provided, the plasma detector has a complex structure, inconveniently.

It is also possible to detect plasma by watching the trace voltage without measuring the electric resistance between the sensor electrode and the workpiece. But, it is difficult to easily detect plasma harmful to machining only by watching the trace voltage since the trace voltage at the time when generating plasma is small in its volume, and fluctuates even if no influence is given to machining. If this method is adopted, the feeding speed of the torch is frequently decreased, so that machining on the workpiece is not smooth.

Then, a plasma detector and a laser beam machine with a plasma detector, for easily detecting plasma harmful to machining, having no complex structure are still desired.

SUMMARY OF THE INVENTION

One aspect of the present invention is a plasma detector of a laser beam machine, said laser beam machine having laser beam radiating means for radiating laser beam on a workpiece, said laser beam radiating means having a sensor electrode facing said workpiece, sensor electrode voltage detecting means for detecting voltage of said sensor electrode, and gap length control means for controlling gap length between said laser beam radiating means and said workpiece on the basis of said voltage of said sensor electrode detected by said sensor electrode voltage detecting means, said plasma detector of said laser beam machine being for detecting plasma generating from said workpiece owing to said laser beam radiated from said laser beam radiating means of said laser beam machine, comprising:

voltage fluctuating section detecting means for detecting a voltage fluctuating section where said voltage of said sensor electrode detected by said sensor electrode voltage detecting means of said laser beam machine fluctuates;

voltage fluctuating time integrating means for integrating voltage fluctuating time corresponding to said voltage fluctuating section detected by said voltage fluctuating section detecting means as voltage fluctuating integrated time;

voltage fluctuation occurrence rate computing means for computing a voltage fluctuation occurrence rate for time on the basis of said voltage fluctuation integrated time integrated by said voltage fluctuating time integrating means; and plasma detection judging means for judging as to whether or not said plasma was detected on the basis of said voltage fluctuation occurrence rate computed by said voltage fluctuation occurrence rate computing means, and for outputting result thus judged.

According to this aspect of the invention, quantity of the generated plasma is taken as a frequency of fluctuating the voltage of the sensor electrode for time with the rate of voltage fluctuation per an hour, so that large volume of the plasma generated can be easily detected by watching the rate of occurrence of voltage fluctuation. By doing so, it is not necessary to provide a circuit for measuring electric resistance between the sensor electrode and the workpiece as in a conventional method since plasma can be detected by utilizing the voltage of the sensor electrode, thereby avoiding a complex structure of the plasma detector.

Besides, the other aspect of the invention is the plasma detector of the laser beam machine, wherein said voltage fluctuating section detecting means has voltage slope computing means for computing voltage slope of said voltage of said sensor electrode detected by said sensor electrode voltage detecting means of said laser beam machine with respect to time, and said voltage fluctuating section detecting means detects a section where said voltage slope computed by said voltage slope computing means exceeds a predetermined value as said voltage fluctuating section.

According to this aspect of the invention, the voltage fluctuating section where the voltage of the sensor electrode fluctuates is detected on the basis of the size of the voltage slope, thereby correctly detecting the voltage fluctuating section and correctly detecting large volume of generated plasma.

Besides, the other aspect of the invention is the plasma detector of the laser beam machine, wherein said voltage fluctuating time integrating means integrates said voltage fluctuating time corresponding to said voltage fluctuating section detected by said voltage fluctuating section detecting means for a predetermined time, and said voltage fluctuation occurrence rate computing means computes said voltage fluctuation occurrence rate on the basis of said voltage fluctuation integrated time integrated for said predetermined time.

According to this aspect of the invention, the voltage fluctuation occurrence rate is computed on the basis of the voltage fluctuation integrated time which is integrated for a predetermined time, thereby correctly detecting quantity of generated plasma.

Besides, the other aspect of the invention is the laser beam machine with the plasma detector, further comprising:

movement driving means for moving and driving said laser beam radiating means at a predetermined feeding speed;

machining execution means for executing machining on said workpiece with said feeding speed and output of laser beam radiation which are instructed by machining program; and machining condition changing means for changing to decrease said feeding speed or said output of laser beam radiation which is instructed by said machining program when said plasma detection judging means outputs said result judged that said plasma was detected;

whereby said machining execution means executes machining on said workpiece at said feeding speed or with said output of laser beam radiation which was changed by said machining condition changing means.

According to this aspect of the invention, the generated plasma can be controlled to disappear by lowering the feeding speed or the output of radiation of laser beam at the time when generating large volume of plasma, thereby smoothly executing machining on a workpiece without an interruption.

Besides, the other aspect of the invention is a laser beam machine with a plasma detector, said laser beam machine having laser beam radiating means for radiating laser beam on a workpiece, and having a sensor electrode facing said workpiece, sensor electrode voltage detecting means for detecting voltage of said sensor electrode, and gap length control means for controlling gap length between said laser beam radiating means and said workpiece on the basis of said voltage of said sensor electrode detected by said sensor electrode voltage detecting means, said laser beam machine with a plasma detector comprising:

voltage slope computing means for computing voltage slope of said voltage of said sensor electrode detected by said sensor electrode voltage detecting means with respect to time;

spatter detection judging means for judging as to whether or not said spatter generating from said workpiece due to said laser beam radiated by said laser beam radiating means was detected on the basis of said voltage slope computed by said voltage slope computing means, and for outputting result thus judged;

voltage fluctuating section computing means for computing a section where said voltage slope computed by said voltage slope computing means exceeds a predetermined value as a voltage fluctuating section where said voltage of said sensor electrode detected by said sensor electrode voltage detecting means fluctuates;

voltage fluctuating time integrating means for integrating voltage fluctuating time corresponding to said voltage fluctuating section computed by said voltage fluctuating section computing means as voltage fluctuating integrated time;

voltage fluctuation occurrence rate computing means for computing a voltage fluctuation occurrence rate for time on the basis of said voltage fluctuation integrated time integrated by said voltage fluctuating time integrating means;

plasma detection judging means for judging as to whether or not said plasma was detected on the basis of said voltage fluctuation occurrence rate computed by said voltage fluctuation occurrence rate computing means, and for outputting result thus judged;

movement driving means for moving and driving said laser beam radiating means at a predetermined feeding speed;

machining execution means for executing machining on said workpiece with said feeding speed and output of laser beam radiation which are instructed by machining program; and machining condition changing means for changing to decrease said feeding speed or said output of laser beam radiation which is instructed by said machining program when said plasma detection judging means outputs said result judged that said plasma was detected;

whereby said machining execution means executes machining on said workpiece with said feeding speed or with said output of laser beam radiation which was changed by said machining condition changing means.

According to this aspect of the invention, spatter can be detected on the basis of the voltage slope, so that the process of computing the voltage slope to be implemented at the time of plasma detection is executed by an existing spatter detector owned by many laser beam machines, thereby improving overall process efficiency of a laser beam machine.

DESCRIPTION OF THE PREFERRED EMBODIMENTS

Figure 1:
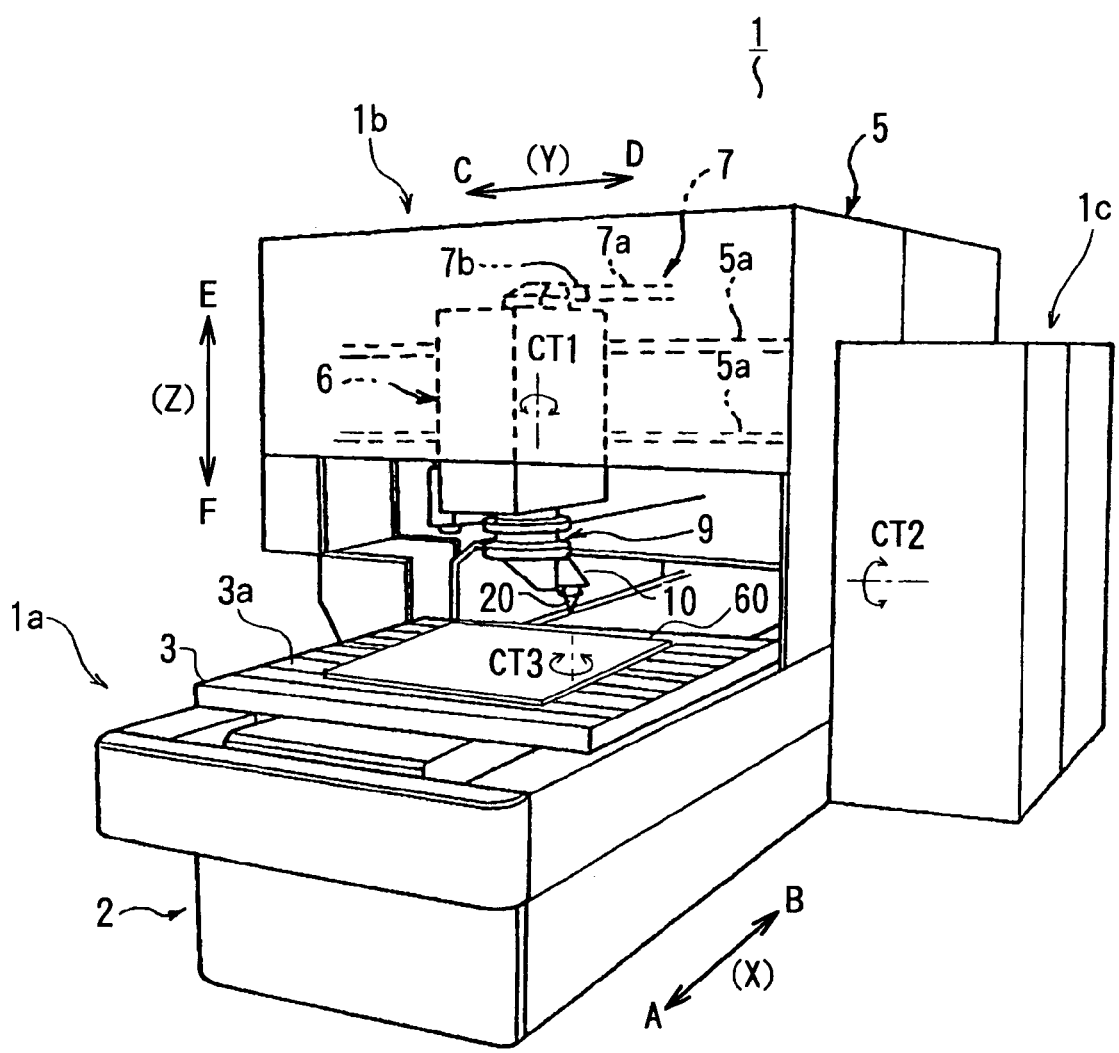
FIG. 1 is a perspective view showing the whole laser beam machine to which the invention is applied.
Figure 2:
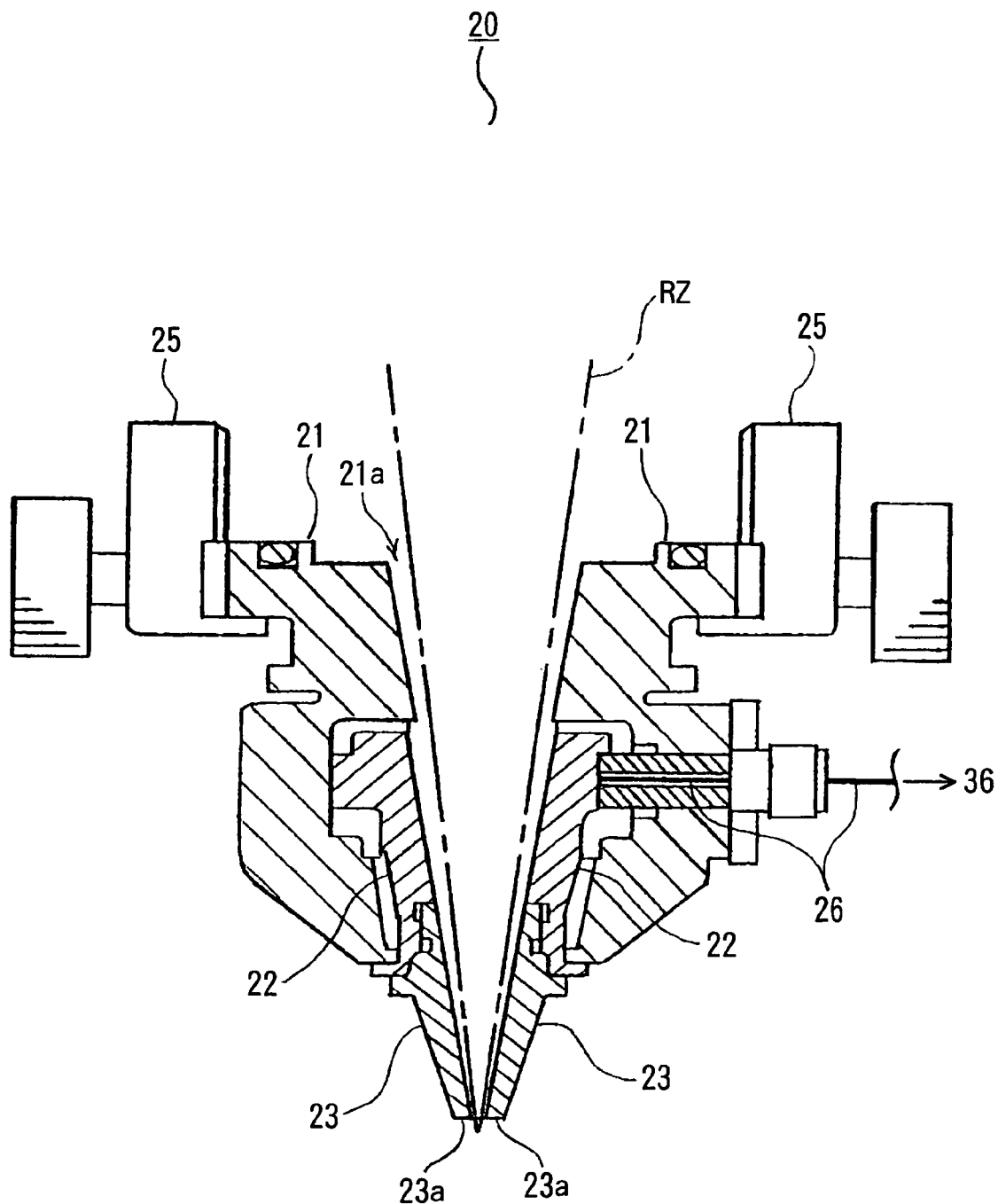
FIG. 2 is a schematic side view (sectional view in a part) showing a torch.
Figure 3:
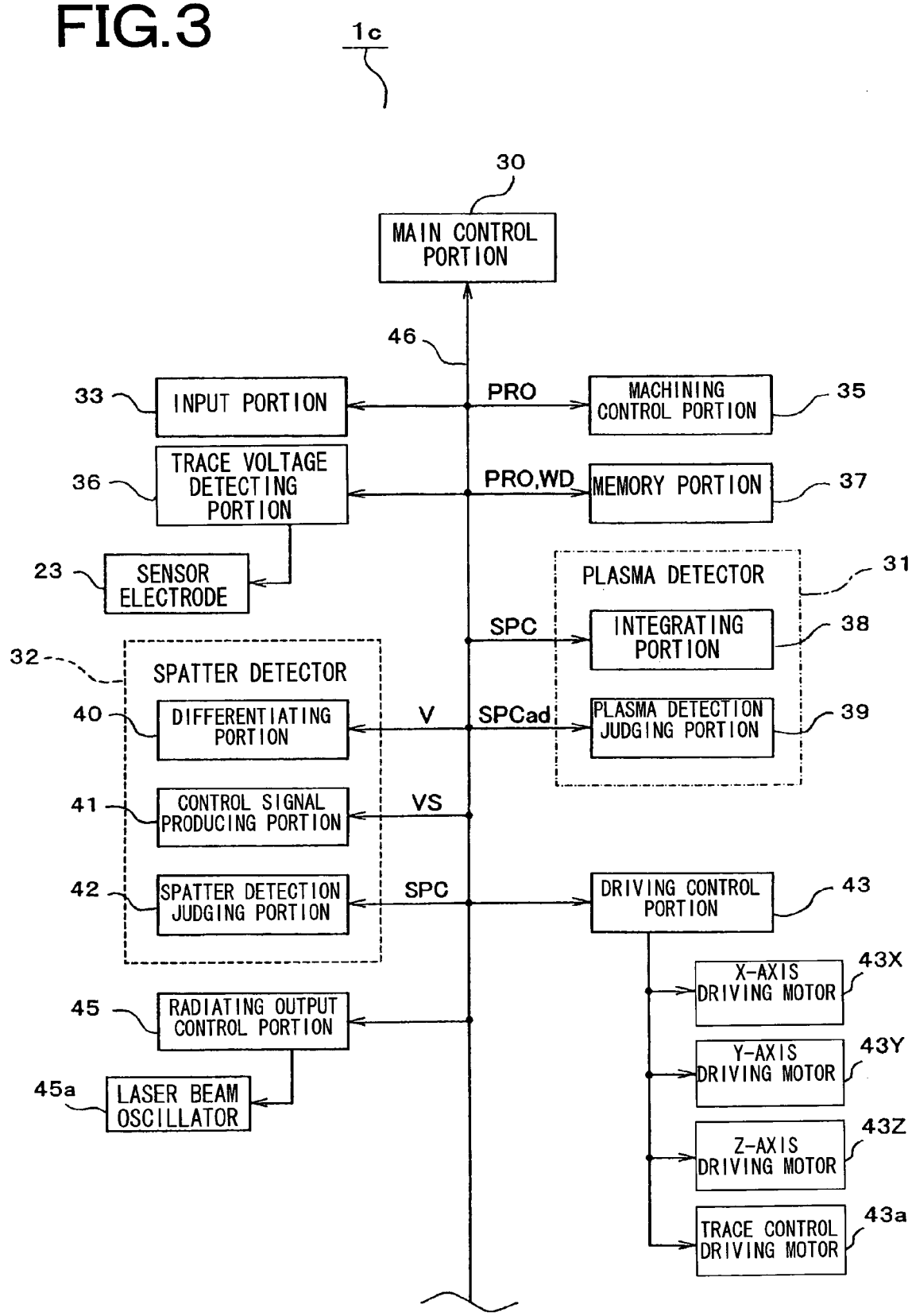
FIG. 3 is a block diagram showing a control unit.
Figure 4:
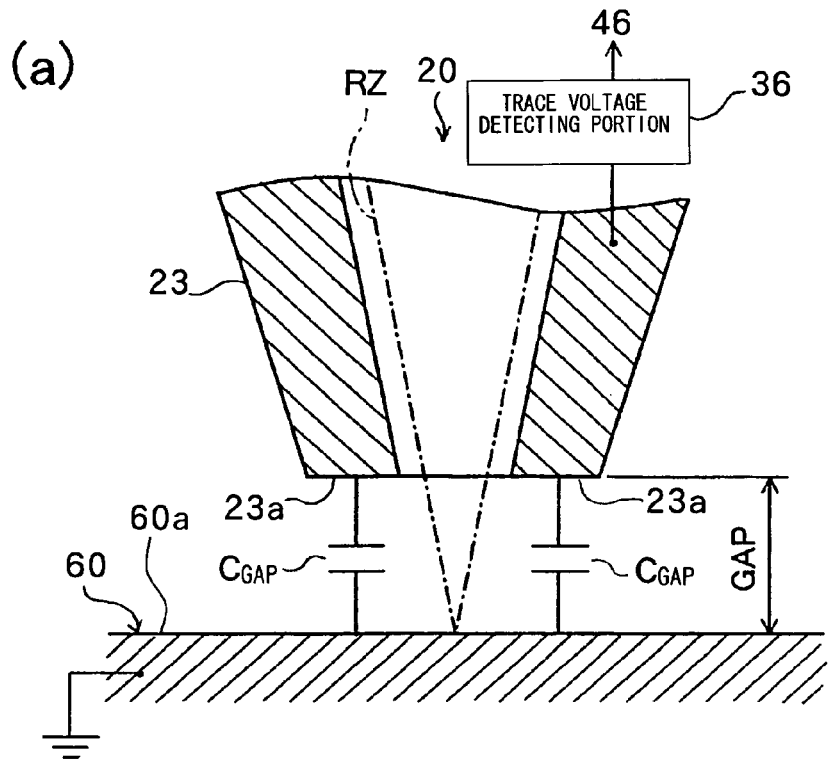
FIG. 4 is an explanation view of trace control wherein (a) shows capacitance when no plasma generating and (b) shows capacitance when large volume of plasma generating.
Figure 4:
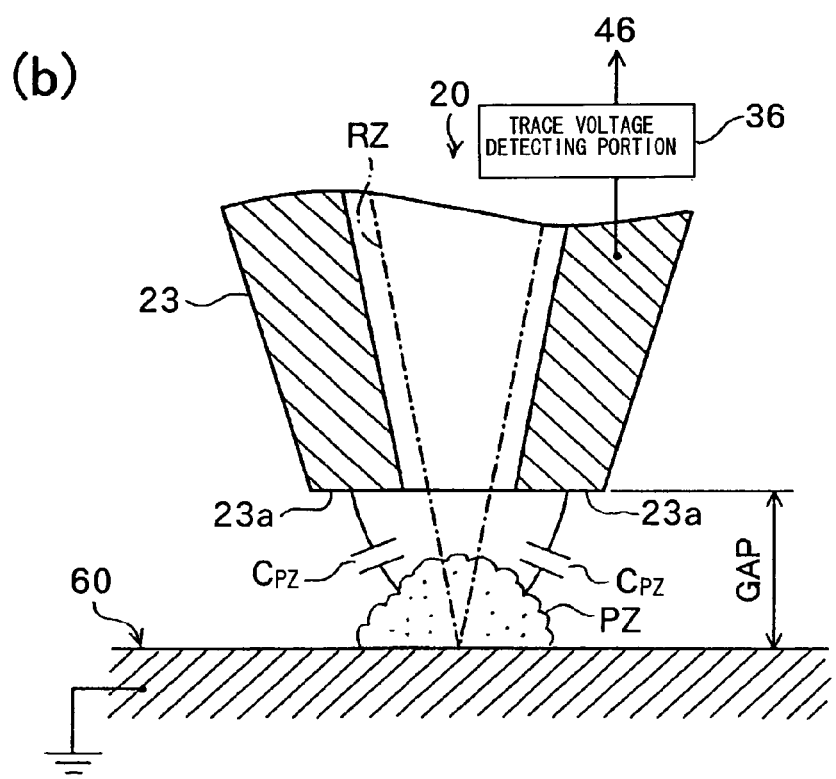
Figure 5:
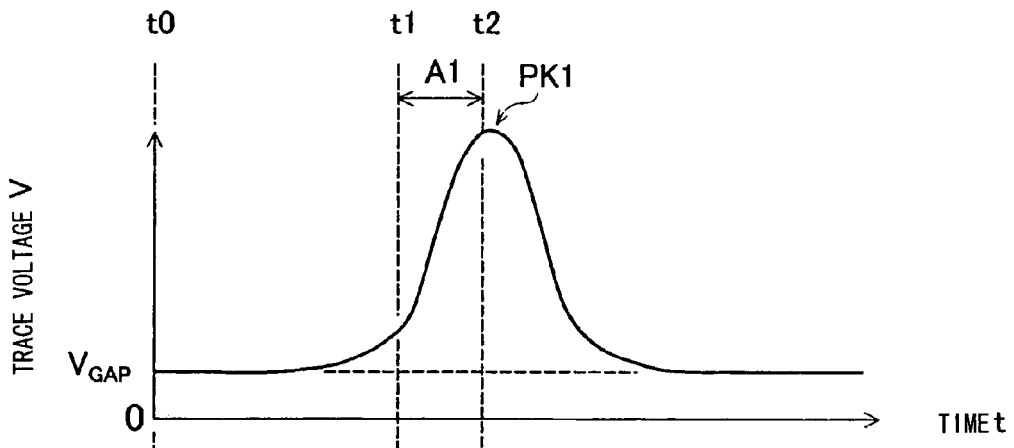
FIG. 5 is a time chart at the time when generating spatter wherein (a) is trace voltage, (b) is voltage slope and (c) is control signal.
Figure 5:
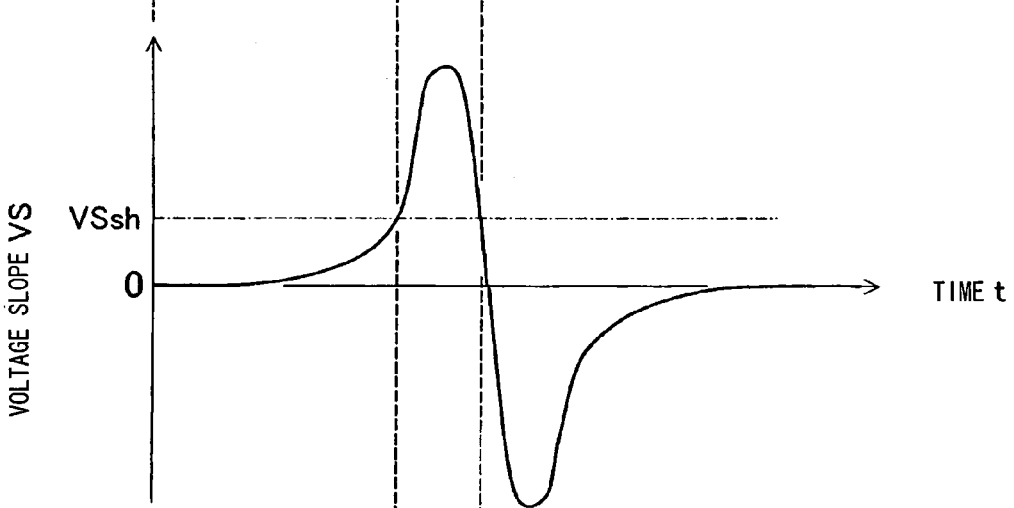
Figure 5:
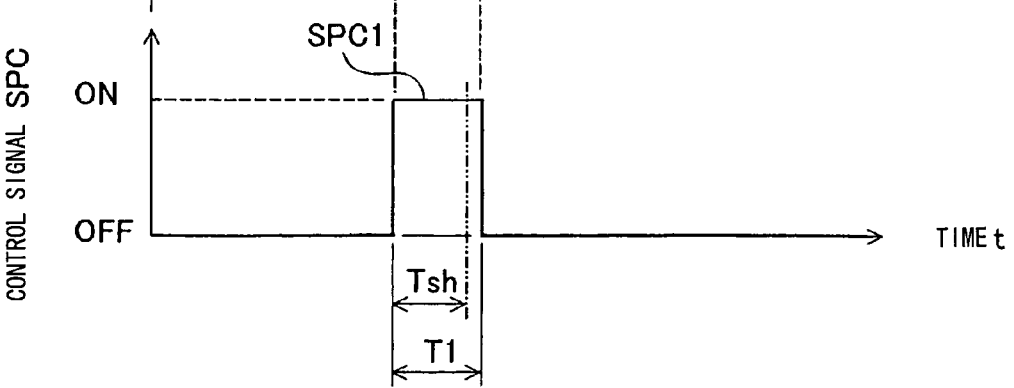
Figure 6:
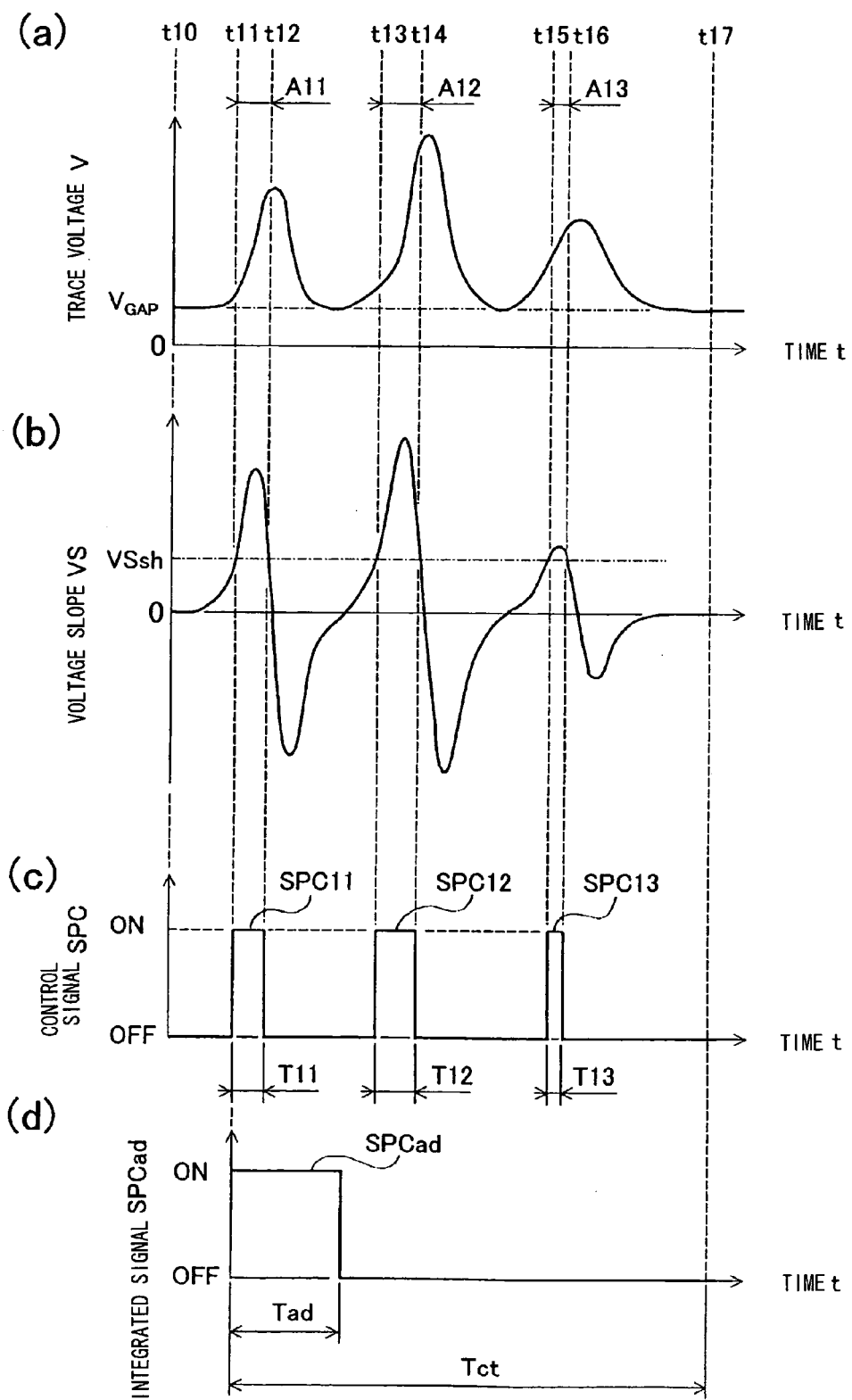
FIG. 6 is a time chart at the time when large volume of plasma generating wherein (a) is trace voltage, (b) is voltage slope, (c) is a control signal and (d) is an integrated signal.

FIG. 1 is a perspective view showing the whole laser beam machine to which the invention is applied, FIG. 2 is a schematic side view (sectional view in a part) showing a torch, FIG. 3 is a block diagram showing a control unit, FIG. 4 is an explanation view of trace control wherein (a) shows capacitance when no plasma generating and (b) shows capacitance when large volume of plasma generating, FIG. 5 is a time chart at the time when generating spatter wherein (a) is trace voltage, (b) is voltage slope and (c) is control signal, and FIG. 6 is a time chart at the time when large volume of plasma generating wherein (a) is trace voltage, (b) is voltage slope, (c) is a control signal and (d) is an integrated signal.

FIG. 1 shows a laser beam machine 1 which is an embodiment of the present invention. The laser beam machine 1 to which the invention is applied is a CNC unit for machining (NC cutting machine), for instance. The laser beam machine 1 has a workpiece stationing unit 1a, a laser beam radiating unit 1b and a control unit 1c. The laser beam radiating unit 1b is located on the workpiece stationing unit 1a in the figure, and the control unit 1c is provided, attaching to the workpiece stationing unit 1a and the laser beam radiating unit 1b.

The workpiece stationing unit 1a has a base 2 for fixing the laser beam machine 1 on a floor, and a table 3 is located on an upper face of the base 2. The table 3 has a horizontal workpiece location surface 3a for putting a workpiece 60 thereon, and the workpiece location surface 3a freely moves and drives in a direction as shown by arrows A and B (X-axis direction) with respect to the base 2 by a X-axis driving motor 43X described hereinafter (not shown) And, the workpiece location surface 3a is provided with earthing process means (not shown) for earthing the workpiece 60.

The laser beam radiating unit 1b has a column 5 and the column 5 is fixed on the base 2, bridging over the table 3 which can move in the X-axis direction so as not to interfere with the table 3. And, the column 5 has rails for saddle 5a, 5a along a horizontal direction as shown by arrows C and D perpendicular to the X-axis direction (a Y-axis direction), and the rails for saddle 5a, 5a are provided with a saddle 6 which freely moves and drives in the Y-axis direction with respect to the column 5 by a Y-axis driving motor 43Y described hereinafter (not shown)

Inside the saddle 6, a machining head body (not shown) is provided, and the machining head body freely moves and drives in a direction as shown by arrows E and F perpendicular to the X-axis and Y-axis directions (a Z-axis direction) with respect to the column 5 by a Z-axis driving motor 43Z described hereinafter (not shown).

The column 5 has a laser beam oscillator 45a described hereinafter (not shown) at a position on the arrow B side of FIG. 1 rather than the saddle 6. Laser beam medium of the laser beam oscillator 45a is a $CO_2$ (carbon dioxide) or YAG (yttrium/alminium/monocrystal garnet). The laser beam oscillator 45a freely oscillates and ejects through the medium. Besides, the later beam oscillator 45a is connected with the machining head body through a laser beam path tube 7.

The laser beam path tube 7 has a path tube 7a (only a part of which is shown in the figure with a broken line) connected with the laser beam oscillator 45a, and an expandable tube 7b for connecting the path tube 7a and the machining head body with each other in the direction as shown by the arrows A and B. The expandable tube 7b has a telescopic mechanism for expanding together with a movement between the saddle 6 and the path tube 7a. That is, the laser beam ejected by the laser beam oscillator 45a reaches the machining head body inside the saddle 6, passing through an inside of the path tube 7a, and then passing through an inside of the expandable tube 7b.

The machining head body has an outside sleeve member 9, and the outside sleeve member 9 is supported by an axis so as to be rotated, driven and positioned with respect to the machining head body with an axial center CT1 parallel to the Z-axis as its center by a proper driving motor (not shown). The outside sleeve member 9 is provided with a rotating top end member 10, and the rotating top end member 10 is supported by an axis so as to be freely rotated, driven and positioned with respect to the outside sleeve member 9 with an axial center CT2 horizontal and perpendicular to the axial center CT1 as its center by a proper driving motor (not shown). The rotating top end member 10 is provided with a torch 20 which faces the workpiece location surface 3a at right angles thereto.

And, the torch 20 is provided with a trace control driving motor 43a described hereinafter (not shown) and the torch 20 freely moves and is freely positioned for a predetermined distance along an axial center CT3 in the direction where laser beam is ejected through the trace control driving motor 43a.

A proper reflecting mirror (not shown) is provided inside the outside sleeve member 9 and the rotating top end member 10. This reflecting mirror is for passing the laser beam, which reached the machining head body, through the insides of the outside sleeve member 9, the rotating top end member 10 and the torch 20, and for radiating the laser beam on the workpiece 60 from the normal line direction (the axial center CT3 of the torch).

A proper converging lens (not shown) is provided inside the outside sleeve member 9, and the converging lens can converge the laser beam on a predetermined focal point in a direction of the board thickness of the workpiece 60. The torch 20 is provided with assist gas evolution means (not shown) connected with a bomb of assist gas, such as nitrogen. The assist gas evolution means freely evolve assist gas to the workpiece 60.

As shown in FIG. 2, the torch 20 is provided with a sleeve member 21, and the sleeve member 21 is engaged with the rotating top end member 10 as shown in FIG. 1 through a holding portion 25. And, the sleeve member 21 is provided with an engagement member 22, and a center electrode 23 which also functions as a nozzle is inserted into the engagement member 22. The sleeve member 21, the engagement member 22 and the center electrode 23 have a hollow portion 21a having a cone-like shape so that converged laser beam RZ (shown with a dashed line) does not interfere, and the laser beam RZ is radiated from a top end 23a of the torch which is a top end portion of the center electrode (nozzle) 23.

The engagement member 22 and the center electrode 23 are comprised of proper conductive material, and the center electrode 23 connects with an electric wiring 26 through the engagement member 22. And, the electric wiring 26 connects with a trace voltage detecting portion 36 described hereinafter.

The control unit 1c of the laser beam machine 1 has a main control portion 30, as shown in FIG. 3, and an input portion 33, such as a keyboard, a machining control portion 35, the trace voltage detecting portion 36, a memory portion 37, an integrating portion 38, a plasma detection judging portion 39, a differentiating portion 40, a control signal producing portion 41, a spatter detection judging portion 42, a driving control portion 43, a radiating output control portion 45 are connected with the main control portion 30 via a bus line 46. Of these portions, the integrating portion 38 and the plasma detection judging portion 39 function as a plasma detector 31 (shown with a dashed line), and the differentiating portion 40, the control signal producing portion 41 and the spatter detection judging portion 42 function as a spatter detector 32 (shown with a broken line).

The trace voltage detecting portion 36 connects with the sensor electrode 23. The driving control portion 43 connects with the X-axis driving motor 43X, the Y-axis driving motor 43Y, the Z-axis driving motor 43Z and the trace control driving motor 43a. The radiating output control portion 45 connects with the laser beam oscillator 45a.

In order to machine the workpiece 60 in the shape of a plate, for instance, with the laser beam machine 1 having the above-mentioned structure, an operator firstly puts the workpiece 60 on the workpiece location surface 3a, as shown in FIG. 1. And, the operator boots the laser beam 1 through a booting switch (not shown) owned by the control unit 1c, so that earthing process means is actuated and the located workpiece 60 is earthed.

When booting the laser beam machine 1, an operator inputs a machining program PRO and workpiece information WD through the input portion 33 (the workpiece information WD may be a part of the machining program PRO). The machining program PRO is comprised of instructions concerning machining shape of the workpiece 60, feeding speed of the torch 20, output of radiation of the laser beam RZ and the like, and the workpiece information WD is comprised of information concerning material or board thickness of the workpiece 60 and the like. When inputting the machining program PRO and the workpiece information WD by an operator, the main control portion 30 stores the machining program PRO and the workpiece information WD which were inputted in the memory portion 37.

Subsequently, an operator inputs a machining instruction through the input portion 33. Receiving this instruction, the main control portion 30 instructs the machining control portion 35 to execute machining control. The machining control portion 35 first reads the machining program PRO out of the memory portion 37, and controls to drive the X-, Y- and Z-axis driving motors 43X, 43Y and 43Z through the driving control portion 43 so as to locate the torch 20 at a predetermined position (a piercing point, for instance) which is instructed by the machining program PRO.

When locating the torch 20 at a predetermined position, the machining control portion 35 oscillates the laser beam oscillator 45a through the radiating output control portion 45 so as to eject the laser beam RZ with a radiating output instructed by the machining program PRO. The ejected laser beam RZ is radiated on the workpiece 60 via the laser beam path tube 7, the machining head body (not shown), the outside sleeve member 9, the rotating top end member 10 and the torch 20. And, the machining control portion 35 actuates the assist gas evolution means (not shown) so as to evolve assist gas onto the workpiece 60.

When radiating the laser beam RZ onto the workpiece 60, the machining control portion 35 starts to control movement of the torch 20. That is, the machining control portion 35 controls to drive the X-, and Y-axis driving motors 43X and 43Y through the driving control portion 43 so as to control to respectively move the torch 20 with respect to the workpiece 60 along a machining shape instructed by the machining program PRO at a feeding speed instructed by the machining program PRO.

And, the main control portion 30 instructs the machining control portion 35 to control movement of the torch 20 and to execute trace control. Receiving this instruction of execution of the trace control, the machining control portion 35 starts to capture voltage of the sensor electrode 23 ("the trace voltage V" hereinafter) from the trace voltage detecting portion 36.

FIG. 4 is an explanation view of trace control, and shows capacitance which occurs between the torch 20 and the workpiece 60. In the figure, simplified capacitance is shown for easy understanding of the invention.

Between the top end 23a of the torch 20 and the workpiece 60, capacitance $C_{GAP}$ of a condenser generates so that both are facing electrodes (that is, a gap length GAP is a distance between both electrodes), as shown in FIG. 4(a). The trace voltage V corresponds to the voltage of this condenser since the workpiece 60 is earthed through an earthing processing means (not shown). When no plasma generating as shown in FIG. 4(a), the trace voltage V is inversely proportional to the capacitance $C_{GAP}$ ($V = Q/C_{GAP}$) since quantity of electric charge Q (not shown) of the condenser is almost constant. And, the trace voltage V is directly proportional to the gap length GAP since the capacitance $C_{GAP}$ is inversely proportional to the gap length GAP ($C_{GAP} = \in OS/GAP$ wherein $\in O$ is dielectric constant in the air and S is effective cross section)

The memory portion 37 stores a corresponding table of the trace voltage V corresponding to the gap length GAP which shows the above-mentioned proportional relation, and the machining control portion 35 starts to capture the trace voltage V from the trace voltage detecting portion 36, and reads the corresponding table and the workpiece information WD out of the memory portion 37.

After reading the corresponding table and the workpiece information WD, the machining control portion 35 computes the gap length GAP to be set in order to constantly maintain the focal point in the plate thickness direction with respect to a surface 60a of the workpiece on the basis of information concerning a material or a plate thickness of the workpiece 60 which is presented by the read workpiece information WD. When computing the gap length GAP to be set, the trace voltage V corresponding to the computed gap length GAP ("the reference voltage $V_{GAP}$" hereinafter) is set on the basis of the read corresponding table.

When setting the reference voltage $V_{GAP}$, the machining control portion 35 computes voltage differential $\Delta V$ of the captured trace voltage V with respect to the reference voltage $V_{GAP}$, and controls to drive the trace control driving motor 43a through the driving control portion 43 in a direction where the voltage differential $\Delta V$ becomes zero (0). By doing so, concerning the torch 20, the gap length GAP is maintained to almost be a predetermined value, and the focal point in the plate thickness direction is almost constantly maintained with respect to the surface 60a of the workpiece irrespective of undulation of the workpiece 60. Besides, the gap length GAP is maintained to be a predetermined value, so that the trace voltage V is also almost maintained to be the reference voltage $V_{GAP}$.

Subsequently, the main control portion 30 instructs the spatter detector 32 (broken line as shown in FIG. 3) to execute spatter detecting control together with the above-mentioned trace control. This spatter detector 32 detects spatter (scatter of metal powder) generated from the workpiece 60 by radiation of the laser beam RZ. Receiving this execution instruction of the spatter detecting control, the differentiating portion 40 of the spatter detector 32 starts to capture the trace voltage V from the trace voltage detecting portion 36. When starting to capture the trace voltage V, the differentiating portion 40 differentiates the trace voltage V successively captured, and outputs voltage slope VS with respect to time to the control signal producing portion 41 of the spatter detector 32.

The control signal producing portion 41 samples the voltage slope VS inputted from the differentiating portion 40 at a predetermined cycle, and judges as to whether or not the sampled voltage slope VS exceeds a predetermined threshold slope VSsh. The control signal producing portion 41 can freely output predetermined voltage of pulse (the minimum pulse width is 1 ms, for instance) as a control signal SPC, and turns ON output of the control signal SPC when judging that the voltage slope VS exceeds the threshold slope VSsh, and turns OFF when judging that the voltage slope VS does not exceed the threshold slope VSsh.

The spatter detecting control at the time when generating spatter is now concretely explained, referring to FIG. 5. FIG. 5 is a time chart at the time when generating spatter wherein (a) shows trace voltage V, (b) voltage slope VS and (c) control signal SPC.

When the trace voltage V at a point of time t0 is maintained to almost be the reference voltage $V_{GAP}$ as shown in FIG. 5(a), the voltage slope VS is zero (0) as shown in FIG. 5(b), so that the control signal producing portion 41 judges that the voltage slope VS does not exceed the threshold slope VSsh (dashed line as shown in FIG. 5(b)), and turns OFF the output of the control signal SPC as shown in FIG. 5(c).

When generating spatter thereafter, the trace voltage V starts to rise, and the voltage slope VS also rises together with the trace voltage V. When the voltage slope VS exceeds the threshold slope VSsh at a point of time t1, the control signal producing portion 41 judges that the voltage slope VS exceeded the threshold slope VSsh, and turns ON the output of the control signal SPC.

The voltage slope VS drops as the trace voltage V approaches a peak PK1. When the voltage slope VS is lower than the threshold slope VSsh at a point of time t2, the control signal producing portion 41 judges that the voltage slope does not exceed the threshold slope VSsh, and turns OFF the output of the control signal SPC. That is, the control signal producing portion 41 detects a section A1 from the point of time t1 to t2 where the trace voltage V is rapidly changed (see FIG. 5(a)), and produces a control signal SPC1 showing the section A1 is ON time as shown in FIG. 5(c), and outputs it to the spatter detection judging portion 42.

When the control signal SPC1 being inputted from the control signal producing portion 41, the spatter detection judging portion 42 judges as to whether or not the ON time of the inputted control signal SPCL exceeds a threshold time Tsh (two-dot chain line as shown in FIG. 5 (c)). When judging that the ON time exceeded the threshold time Tsh, a signal showing spatter was detected is outputted to the machining control portion 35. When judging that ON time did not exceed the threshold time Tsh, the signal showing spatter was detected is not outputted.

In this case, the threshold time Tsh is set to be slightly shorter than the ON time of an average control signal SPC which is measured and computed at the time of generation of spatter. Since ON time T1 of the control signal SPC1 as shown in FIG. 5(c) is longer than the threshold time Tsh, the spatter detection judging portion 42 judges that the ON time T1 exceeded the threshold time Tsh, and outputs the signal showing spatter was detected to the machining control portion 35. Receiving the signal showing spatter was detected, the machining control portion 35 outputs a predetermined signal to the driving control portion 43 and stops the trace control for a while, and outputs a predetermined signal so as to restart the trace control to the driving control portion 43 after a predetermined time when the trace voltage V which has fluctuated due to spatter stabilizes at a predetermined value.

When thus executing spatter detecting control, the trace control is implemented, avoiding the influence due to spatter even if spatter is generated during machining on the workpiece 60, thereby the trace control extremely normally functioning.

Subsequently, the main control portion 30 instructs the plasma detector 31 (dashed line as shown in FIG. 3) to execute plasma detecting control which is a main part of the invention together with the spatter detecting control.

Receiving the instruction of execution of the plasma detecting control, the integrating portion 38 of the plasma detector 31 starts to capture the control signal SPC from the control signal producing portion 41 of the spatter detector 32. After starting to capture the control signal SPC, the integrating portion 38 computes and integrates the control signals SPC successively captured, integrating the ON time of these signals SPC. The integrating portion 38 thus computes and integrates for a predetermined time Tct (described later), and outputs the control signals SPC which were integrated and computed as an integrated signal SPCad to the plasma detection judging portion 39 of the plasma detector 31.

The plasma detecting control at the time when generating large volume of plasma PZ is concretely explained, referring to FIG. 4(b) and FIG. 6. FIG. 6 is a time chart at the time when generating large volume of the plasma PZ wherein (a) shows the trace voltage V, (b) the voltage slope VS, (c) the control signal SPC and (d) an integrated signal SPCad.

If the trace voltage V is maintained to almost be the reference voltage $V_{GAP}$ at a point of time t10 as shown in FIG. 6(a), the voltage slope VS is zero (0) as shown in FIG. 6(b), so that as explained in case of the spatter detecting control, the control signal producing portion 41 of the spatter detector 32 judges that the voltage slope VS did not exceed the threshold slope VSsh (dashed line as shown in FIG. 6(b)), and does not output the control signal SPC as shown in FIG. 6(c).

When generating the plasma PZ from the workpiece 60 as shown in FIG. 4 (b) thereafter, capacitance CPZ is generated between the top end 23a of the torch 20 and the plasma PZ. The plasma PZ is comprised of charged particles, such as electrons and ions. If large volume of the plasma PZ is generated, the quantity of electric charge Q of the above-mentioned capacitance CPZ rises since many electrons are supplied from the plasma PZ, and the trace voltage V rises irrespective of the gap length GAP.

When the trace voltage V thus rises as shown in FIG. 6(a) and the voltage slope VS exceeds the threshold slope VSsh at a section A11 from a point of time t11 to t12, the control signal producing portion 41 of the spatter detector 32 outputs a control signal SPC11 corresponding to the section A11 as shown in FIG. 6(c).

An electron which charged the capacitance CPZ reconnects with an ion comprising the plasma PZ being nearby, so that the quantity of electric charge Q is not stable, and the trace voltage V at the time when generating the plasma PZ repeatedly fluctuates as shown in FIG. 6(a), being different from when generating spatter.

Therefore, the control signal producing portion 41 outputs the control signal SPC whenever the trace voltage V rises, and respectively outputs a control signal SPC12 corresponding to a section A12 from a point of time t13 to t14 and a control signal SPC13 corresponding to a section A13 from a point of time t15 to t16, as shown in FIG. 6(c).

The integrating portion 38 captures these control signals SPC11, SPC12 and SPC13, and integrates ON times T11, T12 and T13 for these signals, and outputs the integrated signal SPCad as shown in FIG. 6(d) to the plasma detection judging portion 39 of the spatter detector 32.

When thus outputting the integrated signal SPCad to the plasma detection judging portion 39, the plasma detection judging portion 39 computes a rate of occurrence of voltage fluctuation RT for a predetermined time Tct. The predetermined time Tct is a constant time from a point of time where the voltage slope VS firstly exceeds the threshold slope VSsh, and is 20 ms, for instance, in this embodiment. Then, as shown in FIG. 6 (d), the rate of occurrence of voltage fluctuation RT is a rate where ON time of the integrated signal SPCad (an integrated time Tad as shown in FIG. 6 (d)) occupies in a predetermined time Tct from the point of time t11 to a point of time t17 (20 ms after t11), that is, a frequency where the trace voltage V fluctuates in the predetermined time Tct.

And, the plasma detection judging portion 39 judges as to whether or not the computed rate of occurrence of voltage fluctuation RT exceeds a rate of occurrence of threshold RTsh. The trace voltage V at the time when generating the plasma PZ repeatedly fluctuates (see FIG. 6(a)), as mentioned before. But, generally, the more quantity of the generated plasma PZ is, the higher the frequency of this fluctuation is, so that the quantity of the generated plasma PZ can be taken as the rate of occurrence of voltage fluctuation RT. Then, the plasma detection judging portion 39 outputs the signal showing that the plasma PZ was detected to the machining control portion 35 when judging that the rate of occurrence of voltage fluctuation RT exceeding the rate of occurrence of threshold RTsh. On the contrary, the portion 39 does not output the signal showing that the plasma PZ was detected when judging no exceeding.

In this case, the rate of occurrence of threshold RTsh is set to be a value (for instance, 10%) slightly lower than an average rate of occurrence of voltage fluctuation RT at the time when generation of large volume of plasma PZ is an obstacle to the trace control If the rate of occurrence of voltage fluctuation RT computed by the plasma detection judging portion 39 is 18% judging from the integrated signal SPCad as shown in FIG. 6(d) it exceeds 10% which is the rate of occurrence of threshold RTsh. Then, the plasma detection judging portion 39 judges that the rate of occurrence of voltage fluctuation RT exceeded the rate of occurrence of threshold RTsh, and outputs the signal showing the plasma PZ was detected to the machining control portion 35.

After receiving the signal of detection of the plasma PZ, the machining control potion 35 outputs an instruction of decreasing the feeding speed by multiplying the feeding speed instructed by the machining program PRO by a predetermined override (50%, for instance) to the driving control portion 43. Receiving such a signal, the driving control portion 43 controls to drive the X-, and the Y-axis driving motors 43X and 43Y so as to decrease the feeding speed at a predetermined rate.

When decreasing the feeding speed, the supplied quantity of metallic steam generating from the workpiece 60 decreases, so that the quantity of electric charge Q charging a condenser decreases, and the trace voltage V drops. At the same time, the speed of producing an electron does not catch up with the speed of reconnecting between an electron and an ion, thereby the plasma PZ disappearing. Then, the capacitance between the top end 23a of the torch and the workpiece 60 returns to $C_{GAP}$ as shown in FIG. 4(a), and the trace volage V returns to the reference volatage $V_{GAP}$.

When the plasma PZ thus disappears, still decreased feeding speed is meaningless, so that the machining control portion 35 cancels the override when no signal of detection of the plasma PZ has been received from the plasma detection judging portion 39 for a predetermined time. That is, when the plasma PZ disappears, the machining control portion 35 instructs the driving control portion 43 to recover the feeding speed instructed by the machining program PRO from the decreased feeding speed after passage of a predetermined time. Receiving such a signal, the driving control portion 43 controls to drive the X-, and the Y-axis driving motors 43X and 43Y so as to increase the feeding speed, so that the feeding speed instructed by the machining program PRO is recovered.

ON time T11, T12 or T13 of the control signal SPC as shown in FIG. 6 (c) may exceed the threshold time Tsh in the spatter detection judging portion 42 (see FIG. 5 (c)). But, no influence is given to an operation of judging detection of plasma by the plasma detector 31 even if the trace control by the machining control portion 35 temporarily stops owing to exceeding the threshold time.

During machining, the plasma detector 31 thus judges as to whether or not the plasma PZ is detected, and the feeding speed is decreased whenever the plasma PZ is detected, so that the trace control is implemented, avoiding the influence of the plasma PZ.

As mentioned before, the plasma detector 31 according to the invention takes quantity of the generated plasma PZ as a frequency of fluctuating the trace voltage V for time with the rate of occurrence of voltage fluctuation RT for time. Therefore, large volume of the plasma PZ generated can be easily detected by watching the rate of occurrence of voltage fluctuation RT. If small volume of the generated plasma PZ gives no influence on the trace control, therefore, no generation of the plasma PZ can be judged, so that it is not necessary to frequently decrease the feeding speed, thereby smoothly machining on the workpiece 60.

Besides, the plasma PZ can be detected by utilizing the trace voltage V, so that it is not necessary to provide a circuit for measuring electric resistance between the sensor electrode 23 and the workpiece 60 as a conventional way, thereby avoiding a plasma detector and a laser beam machine with plasma detector complexly structured.

Furthermore, the plasma detector 31 in the present embodiment detects the plasma PZ by utilizing the control signal SPC from the spatter detector 32. With this method, a part of process is used in common in the plasma detector 31 and the spatter detector 32, thereby actualizing effective process.

In the above-mentioned embodiment, the common process between the plasma detector 31 and the spatter detector 32 is the process of producing the control signal SPC. But, only a process of computing the voltage slope VS may be used in common. And, in the above-mentioned embodiment, the threshold slope VSsh is the same value in the spatter detection control and the plasma detection control. But, it is not always necessary to be the same value, the threshold slope VSsh may be set to be a different value in the spatter detection control and the plasma detection control by using only the process of computing the voltage slope VS in common.

In the example of the above-mentioned embodiment, the section where the trace voltage V fluctuates is detected on the basis of the voltage slope VS, but the method of detection is not limited to this example. The voltage slightly bigger than the reference voltage $V_{GAP}$ may be set as threshold voltage, and the section where the trace voltage V exceeds the threshold voltage may be detected as the section where the trace voltage V fluctuates.

In the above-mentioned embodiment, the rate of occurrence of voltage fluctuation RT was computed on the basis of the integrated time Tad computed by integrating for a predetermined time Tct after the voltage slope VS first exceeded the threshold slope VSsh. But, an elapsed time after the voltage slope VS first exceeded the threshold slope VSsh may be always measured, and the rate of occurrence of voltage fluctuation RT may be always computed concerning the elapsed time.

In the above-mentioned embodiment, the feeding speed is decreased in order to restrain generation of the plasma PZ. But, change of machining condition through which generation of the plasma PZ can be restrained is sufficient. So, output of radiating the laser beam RZ may be decreased in order to do so.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A plasma detector of a laser beam machine, said laser beam machine having a torch for radiating a laser beam on a workpiece, said plasma detector for detecting whether or not plasma generates between said torch and said workpiece, said plasma detector comprising:

a trace control means for holding a gap length between said torch and said workpiece, said trace control means having:

a nozzle at a top end of said torch for introducing said laser beam to said workpiece, said nozzle being an electrode;

a trace voltage detecting means for detecting voltage of said nozzle as trace voltage; and a gap length control means for controlling said gap length between said torch and said workpiece based on said trace voltage of said nozzle which has been detected by said trace voltage detecting means;

a voltage fluctuating section detecting means for detecting a voltage fluctuating section where said trace voltage fluctuates as detected by said trace voltage detecting means;

a voltage fluctuating time integrating means for integrating voltage fluctuating time corresponding to said voltage fluctuating section detected by said voltage fluctuating section detecting means as voltage fluctuating integrated time;

a voltage fluctuation occurrence rate computing means for computing a rate of occurrence of voltage fluctuation for time based on said voltage fluctuation integrated time integrated by said voltage fluctuating time integrating means; and a plasma detection determining means for determining whether or not said plasma was detected based on said rate of occurrence of voltage fluctuation computed by said voltage fluctuation occurrence rate computing means, and for outputting a determination result;

whereby said plasma detector determines whether or not plasma generates between said torch and said workpiece based on said trace voltage detected by said trace control means.

2. The plasma detector of the laser beam machine according to claim 1, wherein said voltage fluctuating section detecting means has voltage slope computing means for computing voltage slope of said trace voltage with respect to time, and said voltage fluctuating section detecting means detects a section where said voltage slope computed exceeds a predetermined value as said voltage fluctuating section.

3. The plasma detector of the laser beam machine according to claim 1, wherein said voltage fluctuating time integrating means integrates said voltage fluctuating time corresponding to said voltage fluctuating section detected by said voltage fluctuating section detecting means for a predetermined time, and said voltage fluctuation occurrence rate computing means computes said voltage fluctuation occurrence rate on the basis of said voltage fluctuation integrated time integrated for said predetermined time.

4. A laser beam machine comprising:

a plasma detector according to claim 1;

a movement driving means for moving and driving said torch at a predetermined feeding speed;

a machining execution means for executing machining on said workpiece with said predetermined feeding speed and an output of laser beam radiation which are instructed by a machining program; and a machining condition changing means for changing said predetermined feeding speed and/or said output of laser beam radiation which is instructed by said machining program when said plasma detection determining means outputs said determination result that said plasma was detected;

whereby said machining execution means executes machining on said workpiece at said changed feeding speed and/or with said changed output of laser beam radiation which was changed by said machining condition changing means.

5. A laser beam machine comprising:

a torch for radiating laser beam on a workpiece;

trace control means for holding a gap length between said torch and said workpiece;

spatter detecting means for detecting whether or not spatter generates from said workpiece a plasma detector for detecting whether or not plasma generates between said torch and said workpiece;

said trace control means having:

a nozzle at a top end of said torch for introducing said laser beam to said workpiece, said nozzle being an electrode;

a trace voltage detecting means for detecting voltage of said nozzle as trace voltage; and a gap length control means for controlling said gap length between said torch and said workpiece based on said trace voltage of said nozzle which has been detected by said trace voltage detecting means;

said spatter detecting means having:

a voltage slope computing means for computing voltage slope of said trace voltage of said nozzle detected by said trace voltage detecting means with respect to time; and a spatter detection determining means for determining whether or not said spatter generating from said workpiece due to said laser beam was detected based on said voltage slope computed by said voltage slope computing means, and for outputting a spatter determination result;

said plasma detector having:

a voltage fluctuating section computing means for computing a section where said voltage slope computed by said voltage slope computing means of said spatter detecting means exceeds a predetermined value as a voltage fluctuating section where said trace voltage fluctuates;

a voltage fluctuating time integrating means for integrating voltage fluctuating time corresponding to said voltage fluctuating section computed by said voltage fluctuating section computing means as voltage fluctuating integrated time;

a voltage fluctuation occurrence rate computing means for computing a voltage fluctuation occurrence rate for time based on said voltage fluctuation integrated time integrated by said voltage fluctuating time integrating means; and a plasma detection determining means for determining whether or not said plasma was detected based on said voltage fluctuation occurrence rate computed, and for outputting a plasma determination result;

a movement driving means for moving and driving said torch at a predetermined feeding speed;

a machining execution means for executing machining on said workpiece with said predetermined feeding speed and an output of laser beam radiation which are instructed by a machining program; and a machining condition changing means for changing said feeding speed and/or said output of laser beam radiation which is instructed by said machining program when said plasma detection determining means outputs said plasma determination result that said plasma was detected;

whereby said machining execution means executes machining on said workpiece with said changed feeding speed and/or with said changed output of laser beam radiation which was changed by said machining condition changing means.

6. A plasma detector of a laser beam machine, said laser beam machine having a torch for radiating laser beam on a workpiece, a trace control unit for holding a gap length between said torch and a workpiece, said plasma detector for detecting whether or not plasma generates between said torch and said workpiece, said trace control unit having: a nozzle at a top end of said torch for introducing said laser beam to said and an electrode; and a trace voltage detecting unit for detecting voltage of said nozzle as trace voltage, said plasma detector comprising:

a gap length control unit for controlling said gap length between said torch and said workpiece based on said trace voltage of said nozzle which has been detected by said trace voltage detecting means;

a voltage fluctuating section detecting unit for detecting a voltage fluctuating section where said trace voltage fluctuates as detected by said trace voltage detecting unit;

a voltage fluctuating time integrating unit for integrating voltage fluctuating time corresponding to said voltage fluctuating section detected by said voltage fluctuating section detecting unit as voltage fluctuating integrated time;

a voltage fluctuation occurrence rate computing unit for computing a voltage fluctuation occurrence rate for time based on said voltage fluctuation integrated time integrated by said voltage fluctuating time integrating unit; and a plasma detection determining unit for determining whether or not said plasma was detected based on said voltage fluctuation occurrence rate computed by said voltage fluctuation occurrence rate computing unit, and for outputting a determination result;

whereby said plasma detector determines whether or not plasma generates between said torch and said workpiece based on said trace voltage detected by said trace control unit.

7. The plasma detector of the laser beam machine according to claim 6, wherein said voltage fluctuating section detecting unit has voltage slope computing unit for computing voltage slope of said trace voltage with respect to time, and said voltage fluctuating section detecting unit detects a section where said voltage slope computed exceeds a predetermined value as said voltage fluctuating section.

8. The plasma detector of the laser beam machine according to claim 6, wherein said voltage fluctuating time integrating unit integrates said voltage fluctuating time corresponding to said voltage fluctuating section detected by said voltage fluctuating section detecting unit for a predetermined time, and said voltage fluctuation occurrence rate computing unit computes said voltage fluctuation occurrence rate on the basis of said voltage fluctuation integrated time integrated for said predetermined time.

9. A laser beam machine comprising:
the plasma detector according to claim 6;
a movement driving unit for moving and driving said torch at a predetermined feeding speed;
a machining execution unit for executing machining on said workpiece with said feeding speed and an output of laser beam radiation which are instructed by a machining program; and
a machining condition changing unit for decreasing said predetermined feeding speed and/or said output of laser beam radiation which is instructed by said machining program when said plasma detection determining unit outputs said determination result that said plasma was detected;
whereby said machining execution unit executes machining on said workpiece at said decreased feeding speed and/or with said decreased output of laser beam radiation which was changed by said machining condition changing unit.

10. A laser beam machine comprising:
a torch for radiating a laser beam on a workpiece;
a trace control unit for holding a gap length between said torch and a workpiece;
a spatter detecting unit for detecting whether or not spatter generates from said workpiece;
a plasma detector for detecting whether or not plasma generates between said torch and said workpiece;
said trace control unit having:
a nozzle at a top end of said torch for introducing said laser beam to said workpiece, said nozzle being an electrode;
a trace voltage detecting unit for detecting voltage of said nozzle as trace voltage; and
a gap length control unit for controlling said gap length between said torch and said workpiece based on said trace voltage of said nozzle which has been detected by said trace voltage detecting means;
said spatter detecting unit having:
a voltage slope computing unit for computing voltage slope of said trace voltage of said nozzle detected by said trace voltage detecting unit with respect to time; and
a spatter detection determining unit for determining whether or not said spatter generating from said workpiece due to said laser beam was detected based on said voltage slope computed by said voltage slope computing unit, and for outputting a spatter determination result;
said plasma detector having:
a voltage fluctuating section computing unit for computing a section where said voltage slope computed by said voltage slope computing unit of said spatter detecting unit exceeds a predetermined value as a voltage fluctuating section where said trace voltage fluctuates;
a voltage fluctuating time integrating unit for integrating voltage fluctuating time corresponding to said voltage fluctuating section computed by said voltage fluctuating section computing unit as voltage fluctuating integrated time;
a voltage fluctuation occurrence rate computing unit for computing a voltage fluctuation occurrence rate for time based on said voltage fluctuation integrated time integrated by said voltage fluctuating time integrating unit; and
a plasma detection determining unit for determining whether or not said plasma was detected based on said voltage fluctuation occurrence rate computed, and for outputting a plasma determination result;
a movement driving unit for moving and driving said torch at a predetermined feeding speed;
a machining execution unit for executing machining on said workpiece with said predetermined feeding speed and an output of laser beam radiation which are instructed by a machining program; and
a machining condition changing unit for decreasing said feeding speed and/or said output of laser beam radiation which is instructed by said machining program when said plasma detection determining unit of said plasma detector outputs said plasma determination result that said plasma was detected;
whereby said machining execution unit executes machining on said workpiece with said decreased feeding speed and/or with said decreased output of laser beam radiation which was changed by said machining condition changing unit.

* * * * *